United States Patent
Shibata

(10) Patent No.: US 9,552,058 B2
(45) Date of Patent: Jan. 24, 2017

(54) VEHICLE-MOUNTED EQUIPMENT OPERATING DEVICE

(71) Applicant: HONDA MOTOR CO., LTD., Tokyo (JP)

(72) Inventor: Naoki Shibata, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 22 days.

(21) Appl. No.: 14/621,684

(22) Filed: Feb. 13, 2015

(65) Prior Publication Data

US 2016/0179189 A1     Jun. 23, 2016

(30) Foreign Application Priority Data

Feb. 18, 2014   (JP) ................................. 2014-028099

(51) Int. Cl.
   *G06F 3/01*   (2006.01)

(52) U.S. Cl.
   CPC ........................ *G06F 3/01* (2013.01)

(58) Field of Classification Search
   CPC ............ G06F 3/01; G06F 3/012; G06F 3/013; G02B 27/01
   See application file for complete search history.

(56) References Cited

U.S. PATENT DOCUMENTS

| | | | |
|---|---|---|---|
| 9,073,568 B2 | 7/2015 | Krauss et al. | |
| 2002/0054172 A1* | 5/2002 | Berman | G06F 3/0481 |
| | | | 715/856 |
| 2010/0238280 A1* | 9/2010 | Ishii | B60K 35/00 |
| | | | 348/77 |
| 2010/0324779 A1* | 12/2010 | Takahashi | B60K 37/06 |
| | | | 701/36 |
| 2013/0063596 A1 | 3/2013 | Ueda et al. | |
| 2014/0129082 A1 | 5/2014 | Takahashi et al. | |

FOREIGN PATENT DOCUMENTS

| | | |
|---|---|---|
| CN | 102791508 | 11/2012 |
| JP | 11-184622 | 7/1999 |
| JP | 2008-030674 | 2/2008 |
| JP | 2010-105417 | 5/2010 |
| JP | 2012-006552 | 1/2012 |
| WO | 2012/176535 | 12/2012 |

OTHER PUBLICATIONS

Japanese Office Action dated Dec. 22, 2015, partial English translation included.
Chinese Office Action dated Oct. 9, 2016 (partial English translation included).

\* cited by examiner

*Primary Examiner* — Lun-Yi Lao
*Assistant Examiner* — Ibrahim Khan
(74) *Attorney, Agent, or Firm* — Rankin, Hill & Clark LLP

(57) ABSTRACT

With a vehicle-mounted equipment operating device, upon receipt of an input from an operator by an operation input unit, and when any one of a plurality of vehicle-mounted instruments, for example, an air conditioner, exists on a line of sight of the operator, a control unit sets the vehicle-mounted instrument that exists on the line of sight as an operation target device, and thereafter, the control unit controls the operation target device based on the input of the operator that has been received by the operation input unit.

5 Claims, 12 Drawing Sheets

VEHICLE-MOUNTED EQUIPMENT OPERATING DEVICE

CROSS-REFERENCE TO RELATED APPLICATION

This application is based upon and claims the benefit of priority from Japanese Patent Application No. 2014-028099 filed on Feb. 18, 2014, the contents of which are incorporated herein by reference.

BACKGROUND OF THE INVENTION

Field of the Invention

The present invention relates to a vehicle-mounted equipment operating device for selecting from among a plurality of vehicle-mounted instruments using a line of sight of an operator of the vehicle.

Description of the Related Art

U.S. Patent Application Publication No. 2010/0324779 (hereinafter referred to as "US2010/0324779A1") discloses an apparatus in which, in the case that a line of sight L of a vehicle occupant is directed toward any one of a plurality of vehicle-mounted instruments (a side mirror 21, a room mirror 22, a navigation system 23, a vehicle-mounted telephone 24, an air outlet 25, or a meter panel 26), the vehicle-mounted instrument indicated by the line of sight L can be operated by a steering switch 16 (refer to the abstract).

According to the second embodiment of US2010/0324779A1, when the vehicle is being driven (i.e., when traveling), if a condition in which a vehicle-mounted instrument can be operated (a state in which a pilot lamp therefor is illuminated) exceeds a predetermined time, the vehicle-mounted instrument is switched from an operable condition to an inoperable condition, and the pilot lamp switches from an illuminated state to a flashing state or a non-illuminated (extinguished) state. In accordance with this feature, the occupant is notified of the fact that the vehicle-mounted instrument cannot be operated, and the line of sight L of the occupant can be returned to a frontal field of view to enable safe driving (see paragraphs [0068] and [0069]).

Japanese Laid-Open Patent Publication No. JP2012-006552 (hereinafter referred to as "JP2012-006552A") has the object of providing a vehicle-mounted equipment operating device, in which a vehicle-mounted instrument can easily be selected as a target object from among a plurality of vehicle-mounted instruments, and desired operations with respect to the vehicle mounted instrument that serves as the target object can be carried out easily and reliably (see paragraph [0005] and the abstract). For accomplishing this object, an operation control unit 35 of JP2012-006552A makes a judgment concerning the line of sight of an occupant by a line of sight judgment means 31, only when it is detected that an operating switch 33 is in an ON state, and in the case that the operating switch 33 is switched from an ON state to an OFF state, receives and accepts an operation to be performed with respect to a vehicle-mounted instrument, which has been notified by a notifying means 32, immediately prior to the OFF state (refer to the abstract).

More specifically, initiation and completion of judgment of the line of sight by the line of sight judgment means 31 are determined using ON and OFF states of a line of sight detection key 26, and operations with respect to the vehicle-mounted instrument are performed by inputs from a cross key 25 (see paragraphs [0020] and [0032] as well as FIG. 3 and FIGS. 5 through 9).

SUMMARY OF THE INVENTION

With the above-described systems, such as that disclosed in US2010/0324779A1, it is necessary for a line of sight L of the occupant (operator) to continue to be oriented toward the vehicle-mounted instrument when the vehicle-mounted instrument that serves as the target object is operated. Stated otherwise, the vehicle-mounted instrument cannot be operated while the line of sight L is directed in a frontward direction of the vehicle (driving field of view). Therefore, operation of the vehicle-mounted instrument that serves as the target object cannot always easily be performed during driving (traveling) of the vehicle.

Further, with the system disclosed in JP2012-006552A, the line of sight detection key 26 is used solely for instructing initiation and completion of the judgment of the line of sight by the line of sight judgment means 31. Therefore, in addition to the cross key 25, the number of parts is increased by the portion where the line of sight detection key 26 is disposed. Furthermore, determination of the line of sight is initiated by turning the line of sight detection key 26 ON, and judgment of the line of sight is completed by turning the line of sight detection key 26 OFF. In this regard, although an advantage is realized from the viewpoint of carrying out detection of the line of sight reliably, there is still room for improvement in terms of the procedure for specifying the vehicle-mounted instruments that serve as operation targets (or stated otherwise, for enhancing ease of operation of the vehicle-mounted instruments).

The present invention has been devised taking into consideration the aforementioned problems, and has the object of providing a vehicle-mounted equipment operating device, in which the configuration for selecting and operating vehicle-mounted instruments to serve as operation targets can be simplified, together with enhancing ease of operation of such vehicle-mounted instruments while the vehicle is being driven (during traveling of the vehicle).

A vehicle-mounted equipment operating device according to the present invention is characterized by a plurality of vehicle-mounted instruments that are mounted in a vehicle, an operation input unit configured to receive an input from an operator for operating the plurality of vehicle mounted instruments respectively, a line of sight detecting unit configured to detect a line of sight of the operator, and a control unit configured to control the vehicle-mounted instruments by the input to the operation input unit and the line of sight detected by the line of sight detecting unit. In this case, upon receipt of an input from the operator by the operation input unit, and when any one of the plurality of vehicle-mounted instruments exists on the line of sight, the control unit selects the vehicle-mounted instrument that exists on the line of sight as an operation target device, and thereafter, the control unit controls the operation target device based on the input of the operator that has been received by the operation input unit.

According to the present invention, upon receipt of an input from an operator by the operation input unit, and when any one of the plurality of vehicle-mounted instruments exists on the line of sight of the operator, the vehicle-mounted instrument that exists on the line of sight is selected as the operation target device. The operation input unit is a unit for receiving and accepting inputs from the operator, for thereby operating each of the plurality of vehicle-mounted instruments, and is not used only for detecting the line of sight of the occupant. Therefore, an operation target device can easily be selected, and after selection of the operation target device, the operation target device can be operated by way of inputs to the operation input unit. Stated otherwise, selection and operation of an operation target device can be performed using the same operation input unit. Consequently, the configuration for selecting and operating vehicle-mounted instruments to serve as operation targets can be simplified, together with enhancing ease of operation of such vehicle-mounted instruments during traveling of the vehicle.

In a state in which a first vehicle-mounted instrument, which is one of the plurality of vehicle-mounted instruments, is selected as the operation target device, upon receipt of an input from the operator by the operation input unit, and when a second vehicle-mounted instrument that differs from the first vehicle-mounted instrument exists on the line of sight, the control unit may switch the operation target device from the first vehicle-mounted instrument to the second vehicle-mounted instrument.

Owing thereto, even if the first vehicle-mounted instrument is currently being operated, by the operator switching the operator's line of sight to the second vehicle-mounted instrument and performing an input to the operating input unit, the operation target device can be switched from the first vehicle-mounted instrument to the second vehicle-mounted instrument. Consequently, switching of operation target devices can easily be performed.

In a case that a line of sight speed, which is a moving speed of the line of sight, is less than or equal to a predetermined speed threshold value, and any one of the plurality of vehicle-mounted instruments exists on the line of sight, the control unit may select the vehicle-mounted instrument that exists on the line of sight as the operation target device, and in a case that the line of sight speed is greater than the speed threshold value, the control unit may not select the vehicle-mounted instrument that exists on the line of sight as the operation target device.

By this feature, switching between operation target devices can be prevented in the case that the line of sight is moved without intending to make a selection of an operation target device, for example, if the line of sight merely passes through a given vehicle-mounted instrument or the like. Consequently, ease of operation of the vehicle-mounted instruments can be enhanced, and operator discomfort accompanying unintentional switching of operation target devices can be avoided.

The second vehicle-mounted instrument may comprise a first display unit configured to display an operation screen for the operation target device, and in a state in which the first vehicle-mounted instrument is the operation target device, upon receipt of an input from the operator by the operation input unit, even if the first display unit exists on the line of sight, the control unit may prohibit switching or not carry out switching of the operation target device from the first vehicle-mounted instrument to the second vehicle-mounted instrument.

Owing thereto, the operator can carry out operations of the first vehicle-mounted instrument while observing the operation screen in a portion of the second vehicle-mounted instrument. Thus, since the operator can easily grasp the settings, etc., of the first vehicle-mounted instrument, ease of operation for the operator can be enhanced.

The first vehicle-mounted instrument may be selected as the operation target device, and when a display of the operation screen for the first vehicle-mounted instrument is initiated on the first display unit, the control unit may cause the operation screen to appear while moving in a direction from the first vehicle-mounted instrument to the first display unit.

By this feature of the present invention, the operator can understand intuitively that an operation screen for which one of the vehicle-mounted instruments is being displayed on the first display unit (or stated otherwise, that the operation screen for the first vehicle-mounted instrument is being displayed).

The vehicle-mounted equipment operating device may further comprise a second display unit that differs from the first display unit, and in a state in which the first vehicle-mounted instrument is the operation target device and the operation screen is displayed on the first display unit, in a case that a predetermined operation input is carried out on the operation input unit and the line of sight moves from the first display unit to the second display unit, the control unit may display a portion or all of the display content of the operation screen on the second display unit.

Owing thereto, for example, in the case that the operator wishes to use the second display unit more than the first display unit, a display that follows with the desire of the operator can be carried out by a simple operation of moving one's line of sight and making a predetermined operation input to the operation input unit. In particular, in the event it is easier for the operator to visualize or observe the second display unit than the first display unit, by displaying operation information on the second display unit, ease of operation can be enhanced.

The vehicle-mounted equipment operating device may further comprise a sound outputting unit configured to output a sound accompanying an input to the operation input unit. In a case that the first display unit does not exist on the line of sight, the control unit may perform output of the sound by the sound outputting unit. On the other hand, in a case that the first display unit exists on the line of sight, the control unit may stop output of the sound by the sound outputting unit.

By this feature, it is possible to prevent output of sound that is considered as being unnecessary if the operator is looking at the first display unit, while considered as being necessary if the operator were not looking at the first display unit. Consequently, marketability of the vehicle-mounted equipment operating device can be increased.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

1. Description of Overall Structure

[1-1. Overall Structure]

Figure 1:
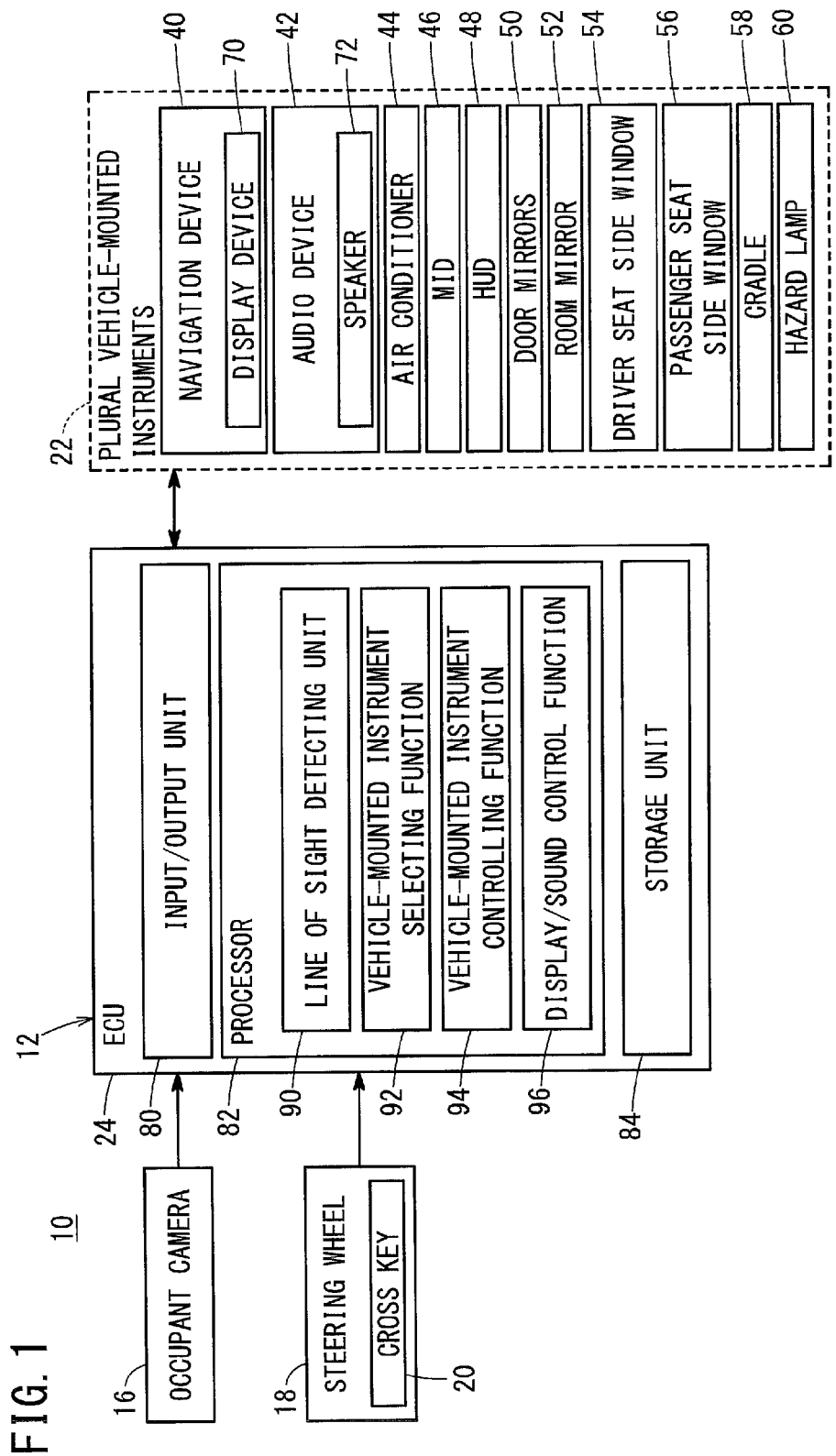
FIG. 1 is an overall block diagram of a vehicle, in which a vehicle-mounted equipment operating device according to an embodiment of the present invention is installed.
Figure 2:
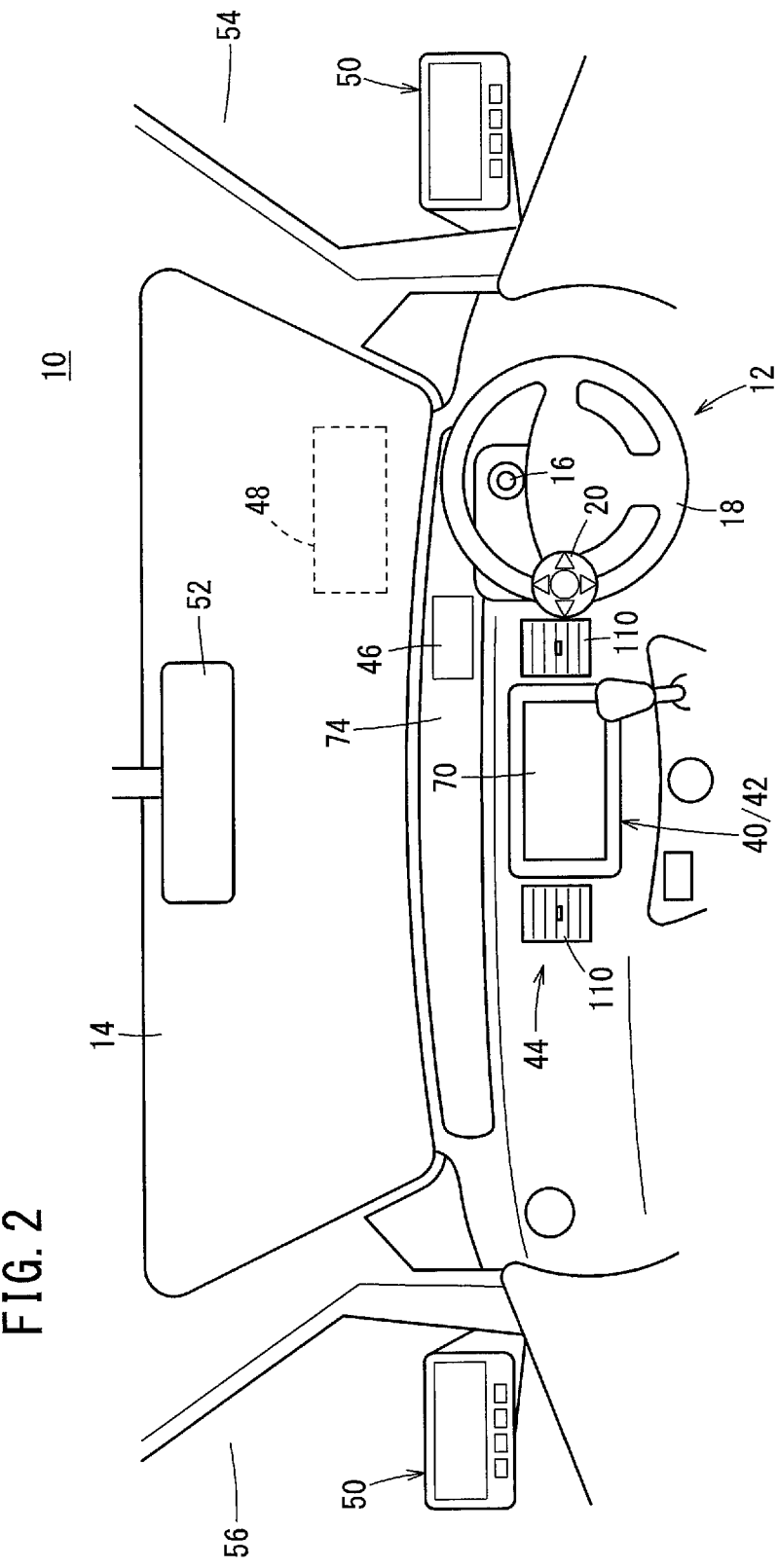
FIG. 2 is a view showing the external appearance in the vicinity of a front window of the vehicle.

FIG. 1 is an overall block diagram of a vehicle 10 in which a vehicle-mounted equipment operating device 12 (hereinafter also referred to as an "operating device 12") according to an embodiment of the present invention is installed. FIG. 2 is a view showing the external appearance in the vicinity of a front window 14 of the vehicle 10. As shown in FIGS. 1 and 2, the operating device 12 includes an occupant camera 16, a cross key 20 disposed on a steering wheel 18, a plurality of vehicle-mounted instruments 22, and an electronic control unit 24 (hereinafter also referred to as an "ECU 24"). As understood from FIG. 2, the vehicle 10 of the present embodiment is a so-called right-hand steering vehicle. In place thereof, a similar configuration can be adopted for use with a left-hand steering vehicle.

[1-2. Occupant Camera 16]

As shown in FIG. 2, the occupant camera 16 is disposed in front of a driver 300 (see FIG. 7, etc.) on a non-illustrated steering column, and captures an image of the face (hereinafter referred to as a "facial image") of the driver 300. The position of the occupant camera 16 is not limited and, for example, may be arranged in the vicinity of a room mirror (rear view mirror) 52. Further, the occupant camera 16 is not limited to capturing an image from a single direction, and may be configured to capture an image (a so-called stereo image) from a plurality of directions.

[1-3. Cross Key 20]

Figure 3:
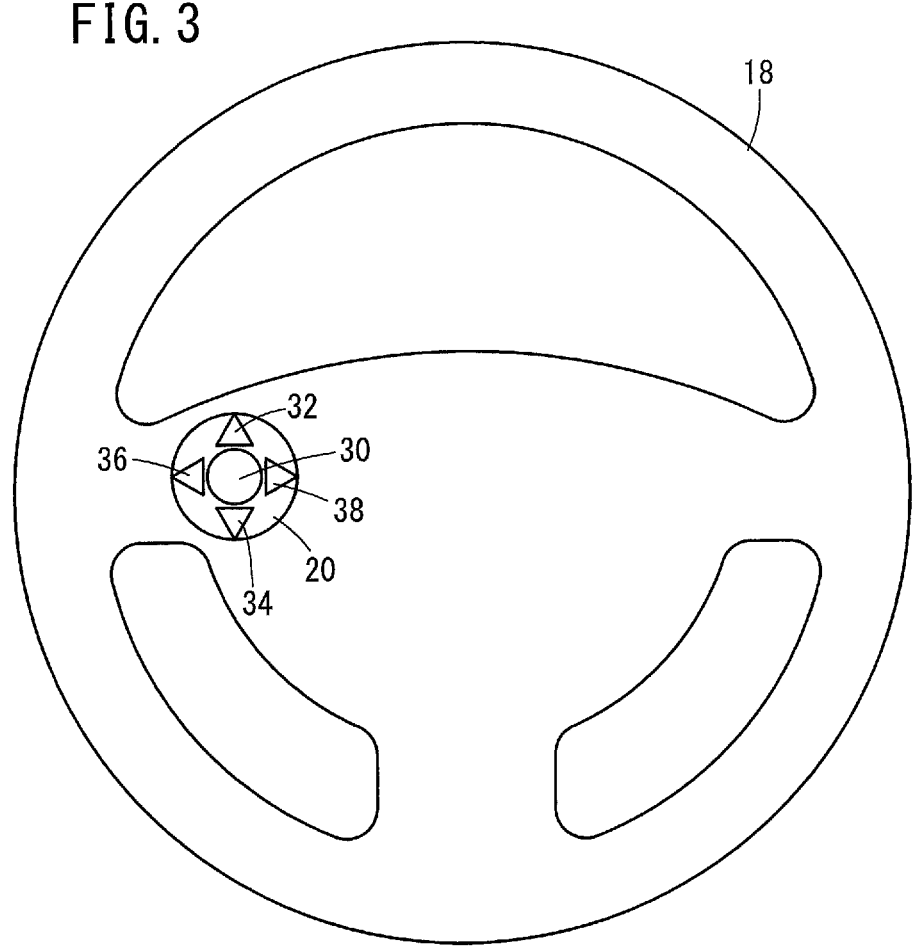
FIG. 3 is a front view showing the external appearance of a steering wheel of the vehicle.

Using the cross key 20, the driver 300 can specify a particular vehicle-mounted instrument 22 (hereinafter referred to as an "operation target device") to be operated as a target object, and carry out input of operations of the specified vehicle-mounted instrument 22. As shown in FIG. 3, the cross key 20 includes a center button 30, an up button 32, a down button 34, a left button 36, and a right button 38. The cross key 20 is shown at an enlarged scale in FIG. 2. Respective operations of the vehicle-mounted instruments 22 are carried out using the cross key 20.

[1-4. Plural Vehicle-Mounted Instruments 22]

In the present embodiment, among the plural vehicle mounted instruments 22 (see FIG. 1), there are included a navigation device 40, an audio device 42, an air conditioner 44, a multi-information display 46 (hereinafter referred to as a "MID 46"), a head-up display (hereinafter referred to as an "HUD 48"), door mirrors 50, a room mirror 52, a driver seat side window 54, a passenger seat side window 56, a cradle 58, and a hazard lamp 60. Among the vehicle-mounted instruments 22, devices apart from those mentioned above (e.g., a running mode changeover switch for switching a running mode) may be included.

The navigation device 40 is an instrument for guiding the vehicle along a route, and comprises a display device 70 (first display device), which is arranged centrally in a widthwise direction in the front of the vehicle 10 (see FIG. 2). In the present embodiment, on a display screen 100 (see FIG. 7, etc.) of the display device 70, there are included a non-operation screen 102 for purposes apart from operations of the vehicle-mounted instruments 22 that serve as target objects (hereinafter referred to as "operation target devices 22tar"), and an operation screen 104 for operations of the operation target devices 22tar.

As content suitable for display on the non-operation screen 102, for example, there may be included a route guidance screen (map display screen, etc.) for the navigation device 40, and a TV broadcast content display screen. As content that is displayed on the operation screen 104, for example, there are included a setting screen (destination, route guidance method, sound volume, etc.) for the navigation device 40, a setting screen (music selection, channel selection, volume, etc.) for the audio device 42, a setting screen (cooling/heating/fan switch, temperature setting, selection of blowing position, etc.) for the air conditioner 44, and a setting screen (brightness, color adjustment, etc.) for the HUD 48.

The audio device 42 is equipped with a speaker 72. When the navigation device 40 performs route guidance, audio or voice guidance is given through the speaker 72. Further, when the audio device 42 is operated, the display device 70 of the navigation device 40 is used. Since in terms of the external appearance thereof, the navigation device 40 and the audio device 42 are formed integrally, in FIG. 2, reference numerals 40 and 42 are assigned to the same location.

The MID 46 is a display device (second display device) arranged on a meter panel 74 (see FIG. 2) for displaying various information relating to traveling of the vehicle. As shown in FIG. 2, the MID 46 is arranged on a side (i.e., on the driver's seat side) having the steering wheel 18 in the lateral direction on the front side of the vehicle 10. A non-illustrated mobile terminal (smart phone or the like) is arranged in the cradle 58. A connector (not shown) made up of wires that connect the mobile terminal and the ECU 24 is disposed in the cradle 58.

[1-5. ECU 24]

The ECU 24 controls the vehicle-mounted equipment operating device 12 (according to the present embodiment, in particular, each of the vehicle-mounted instruments 22), and as shown in FIG. 1, is equipped with an input/output unit 80, a processor 82, and a storage unit 84. The processor 82 includes a line of sight detecting function 90, a vehicle-mounted instrument selecting function 92, a vehicle-mounted instrument controlling function 94, and a display/sound control function 96.

According to the present embodiment, by using the functions 90, 92, 94 and 96, the respective vehicle-mounted instruments 22 can easily be controlled. More specifically, by the driver 300 operating the cross key 20 together with directing a driver's line of sight 302 (see FIG. 7, etc.) toward a certain operation target device 22tar, the operation target device 22tar can be operated.

The line of sight detecting function 90 is a function for detecting the line of sight 302 (eye orientation) of the driver 300 (operator) based on the facial image from the occupant camera 16. The vehicle-mounted instrument selecting function 92 is a function for selecting or specifying the vehicle-mounted instrument 22 that exists on the line of sight 302 of the driver 300 (i.e., on the line of sight direction D1) as the operation target device 22tar, responsive to operations of the cross key 20. The vehicle-mounted instrument controlling function 94 is a function for controlling the operation target device 22tar that was selected by the vehicle-mounted instrument selecting function 92, responsive to operation inputs from the driver 300. The display/sound control function 96 is a function for controlling displays and sounds, accompanying selection and operation of the operation target device 22tar.

2. Controls of the Present Embodiment

[2-1. Overview of Controls]

As described above, in the present embodiment, the driver 300 operates the cross key 20 together with directing the driver's line of sight 302 toward a certain operation target device 22tar, whereby the operation target device 22tar can be operated.

Figure 4:
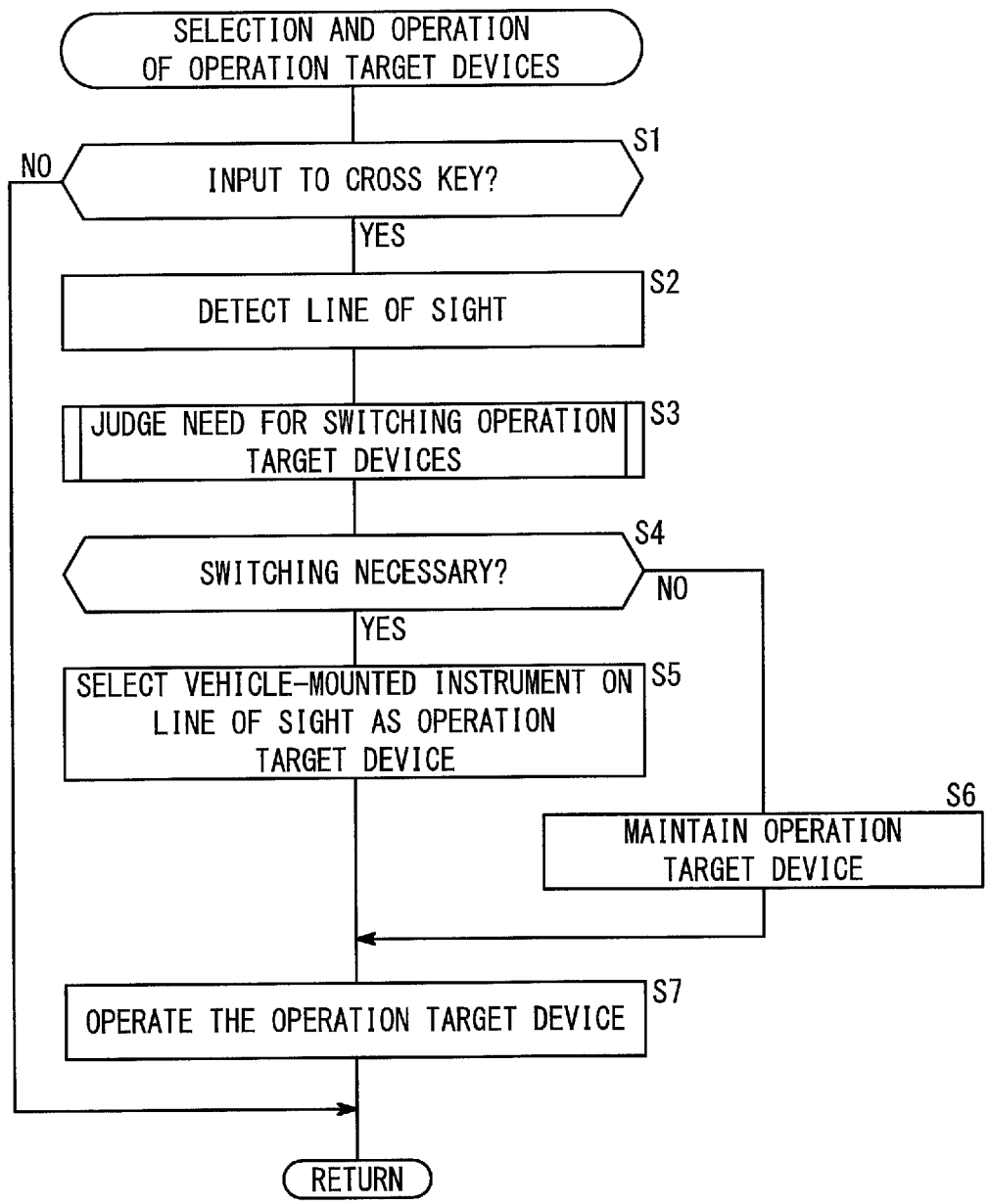
FIG. 4 is a flowchart of a process for selecting and operating a vehicle-mounted instrument that serves as an operation target (hereinafter referred to as an "operation target device")

FIG. 4 is a flowchart of a process for selecting and operating an operation target device 22tar. It should be noted that the flowchart of FIG. 4 can be used for both of cases in which an operation target device 22tar is selected and in which an operation target device 22tar is not selected.

In step S1 of FIG. 4, the ECU 24 judges whether or not an input has been made to the cross key 20 (operation input unit). The input to the cross key 20 may be made with respect to any of the buttons 30, 32, 34, 36, 38. Alternatively, in step S1, an input can be made to any one or a plurality of the buttons 30, 32, 34, 36, 38. If an input is not made (step S1: NO), the current process is brought to an end, and after elapse of a predetermined time period, the process from step S1 is repeated. If an input has been made (step S1: YES), then in step S2, the ECU 24 detects the line of sight 302 (or the line of sight direction D1) based on the facial image of the driver 300 captured by the occupant camera 16.

In step S3, using the line of sight 302 determined in step S2, the ECU 24 judges whether or not switching of operation target devices 22tar is required. Details of such a judgment will be described later with reference to FIG. 5.

Based on the result of the judgment of step S3, if switching of operation target devices 22tar is required (step S4: YES), then in step S5, the ECU 24 selects, as the operation target device 22tar, the vehicle-mounted instrument 22 that lies on the line of sight 302 (or coincides with the line of sight direction D1). If switching of operation target devices 22tar is not required (step S4: NO), then in step S6, the ECU 24 maintains the operation target device 22tar that has been designated up to that point. In the case that an operation target device 22tar has not yet been selected at the time of step S6, the operation target device 22tar remains unselected.

In step S7, the ECU 24 operates the operation target device 22tar based on the input made to the cross key 20 (the input made to the respective buttons 30, 32, 34, 36, 38). Operations of the operation target device 22tar can be performed, for example, according to the methods of US2010/0324779A1 or JP2012-006552A, or by the method of U.S. Patent Application Publication No. 2013/0063596.

Step S2 of FIG. 4 is performed using the line of sight detecting function 90 of the ECU 24. Step S1 and steps S3 through S6 are performed using the vehicle-mounted instrument selecting function 92. Step S7 is performed using the vehicle-mounted instrument controlling function 94 and the display/sound control function 96.

[2-2. Judgment of Whether or not Switching of Operation Target Devices 22tar is Required]

Figure 5:
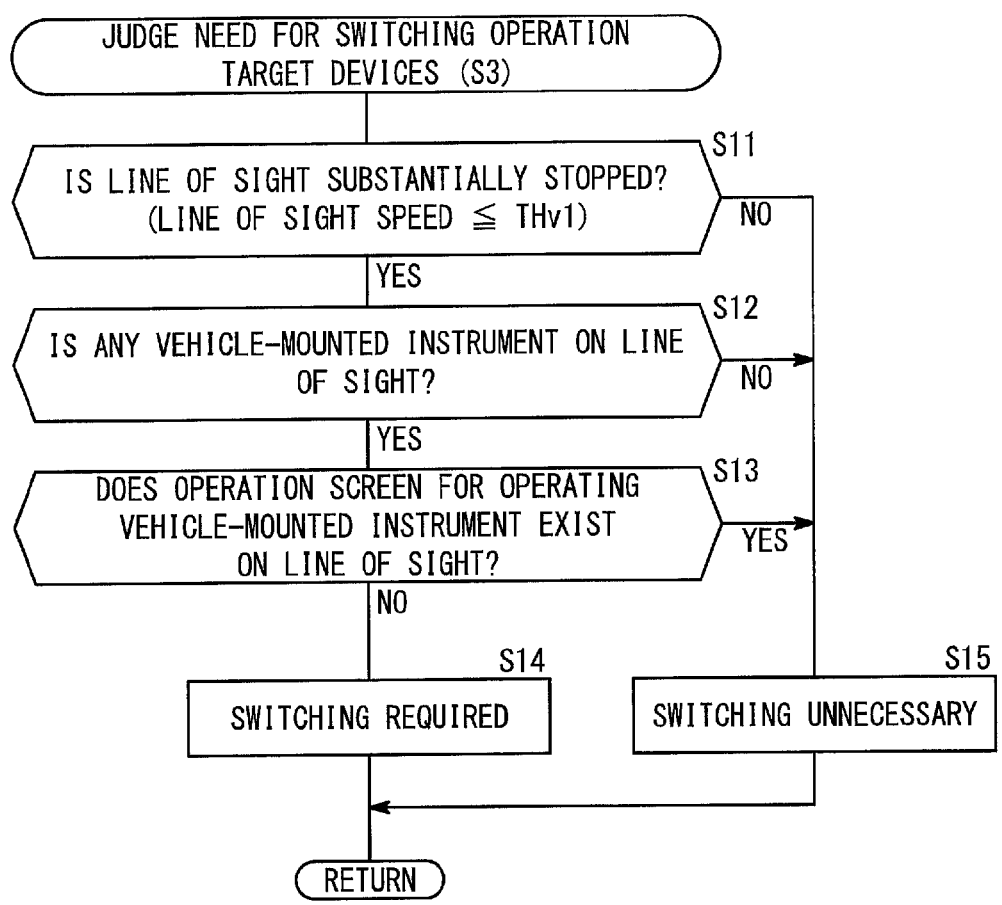
FIG. 5 is a flowchart (details of step S3 of FIG. 4) of a process for judging whether or not switching of operation target devices is needed.

FIG. 5 is a flowchart (details of step S3 of FIG. 4) of a process for judging whether or not switching of operation target devices 22tar is needed. Each of the steps of FIG. 5 is carried out using the vehicle-mounted instrument selecting function 92 of the ECU 24. In step S11, the ECU 24 judges whether or not the line of sight 302 is substantially in a stopped (still or immobile) state. Such a judgment is carried out by determining whether or not an amount of change per unit time of the line of sight 302 (hereinafter referred to as a "line of sight speed V1") is less than or equal to a threshold value THv1 (hereinafter referred to as a "line of sight speed threshold value THv1").

The line of sight speed V1 can be measured using at least one of the orientation or the coordinates of the line of sight 302. Further, the threshold value THv1 is a threshold for judging whether or not the line of sight 302 is substantially stopped (or stated otherwise, whether or not the driver 300 is watching, i.e., gazing steadily at, a specified vehicle mounted instrument 22). The judgment of step S11 can be carried out based on a method apart from that of determining the line of sight speed V1 (for example, an amount of change per unit time of an eye orientation and/or a facial orientation).

In the case that the line of sight 302 is not substantially stopped (step S11: NO), it can be considered that the driver 300 is not gazing steadily at a specified vehicle-mounted instrument 22, from the fact that the line of sight 302 is currently moving, in terms of at least the change in the line of sight 302. Thus, in step S15, the ECU 24 judges that there is no need to switch the operation target device 22tar.

In the case that the line of sight 302 is substantially stopped (step S11: YES), then in step S12, the ECU 24 judges whether or not any one of the vehicle-mounted instruments 22 is on the line of sight 302 (in the line of sight direction D1). Such a judgment is carried out in the following manner, for example. More specifically, the storage unit 84 of the ECU 24 stores beforehand virtual regions concerning each of the vehicle-mounted instruments 22, for the purpose of judging whether or not the respective vehicle mounted instruments 22 exist on the line of sight 302 (in the line of sight direction D1). In addition, the ECU 24 judges whether or not any one of the virtual regions is on the line of sight 302 detected in step S2 of FIG. 4 (stated otherwise, whether any one of the virtual regions intersects with the line of sight 302).

Moreover, concerning the navigation device 40, the audio device 42, the air conditioner 44, the MID 46, the HUD 48, the door mirrors 50, the room mirror 52, the driver seat side window 54, and the passenger seat side window 56, which are among the plurality of vehicle-mounted instruments 22, the actual regions where such vehicle-mounted instruments 22 exist are set to the virtual regions as they are. However, a common virtual region can be established, which integrates the regions of the navigation device 40 and the audio device 42 together as one.

Further, concerning the virtual region of the cradle 58, based on a judgment that the mobile terminal is connected to the connector, the ECU 24 sets the region occupied by the cradle 58 and the mobile terminal to the virtual region. If it is judged that the mobile terminal is not connected to the connector, the region occupied by the cradle 58 and the mobile terminal (the region set beforehand) is set to the virtual region. Concerning the virtual region of the hazard lamp 60, the region occupied by a non-illustrated hazard switch is set to the virtual region.

In the case that none of vehicle-mounted instruments 22 exist on the line of sight 302 (step S12: NO), it can be considered that the driver 300 is not gazing steadily at a specified vehicle-mounted instrument 22. Thus, in step S15, the ECU 24 judges that there is no need to switch the operation target device 22tar. If the line of sight direction D1 is oriented toward any one of the vehicle-mounted instruments 22 (step S12: YES), the process proceeds to step S13.

In step S13, the ECU 24 judges whether or not the operation screen 104 for operating the operation target device 22tar (see FIG. 7 etc.) exists on the line of sight 302 (in the line of sight direction D1). In the present embodiment, the navigation device 40 may be included in the operation target device 22tar. Further, the ECU 24 displays on the display device 70 of the navigation device 40 the operation screen 104 for the operation target device 22tar (see FIGS. 7, 10 and 12, to be described later). Therefore, in the case that the line of sight 302 of the driver 300 is not oriented to select the navigation device 40, but is directed to observe the operation screen 104, it is necessary to prevent the operation target device 22tar from switching to the navigation device 40. Thus, by making use of step S13, the ECU 24 can avoid unintentional switching to the navigation device 40.

In the case that the operation screen 104 of the operation target device 22tar exists on the line of sight 302 (step S13: YES), then in step S15, the ECU 24 judges that switching of operation target devices 22tar is unnecessary. In the case that the operation screen 104 of the operation target device 22tar does not exist on the line of sight 302 (step S13: NO), then in step S14, the ECU 24 judges that switching of operation target devices 22tar is required.

The judgment of step S13 can be included within the judgment of step S12. More specifically, upon judging whether or not the navigation device 40 is on the line of sight 302 (in the line of sight direction D1), the ECU 24 can determine to exclude the display device 70, or the display screen 100 or the operation screen 104 shown therein (i.e., to treat the display device 70, or the display screen 100 or the operation screen 104, as an exclusion zone). Therefore, for judging whether the navigation device 40 exists on the line of sight 302, within the navigation device 40, it is necessary for a portion, which excludes the display device 70, or the display screen 100 or the operation screen 104, to exist on the line of sight 302.

[2-3. Display and Sound Output Accompanying Selection and Operation of Operation Target Device 22tar]

(2-3-1. Overview of Display/Output-Sound Control)

Figure 6:
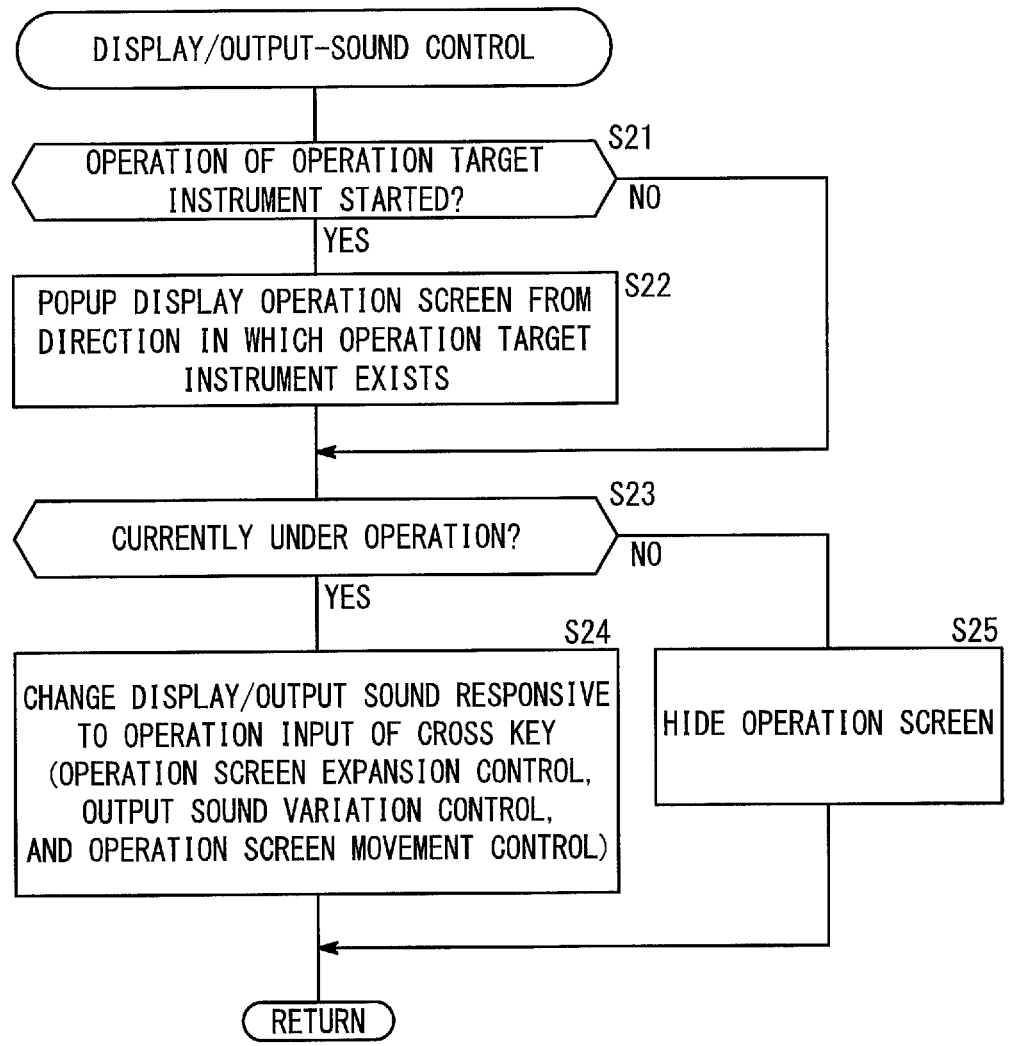
FIG. 6 is a flowchart of a process for controlling displays and output of sound (hereinbelow referred to as a "display/output-sound control") accompanying selection and operation of an operation target device.
Figure 7:
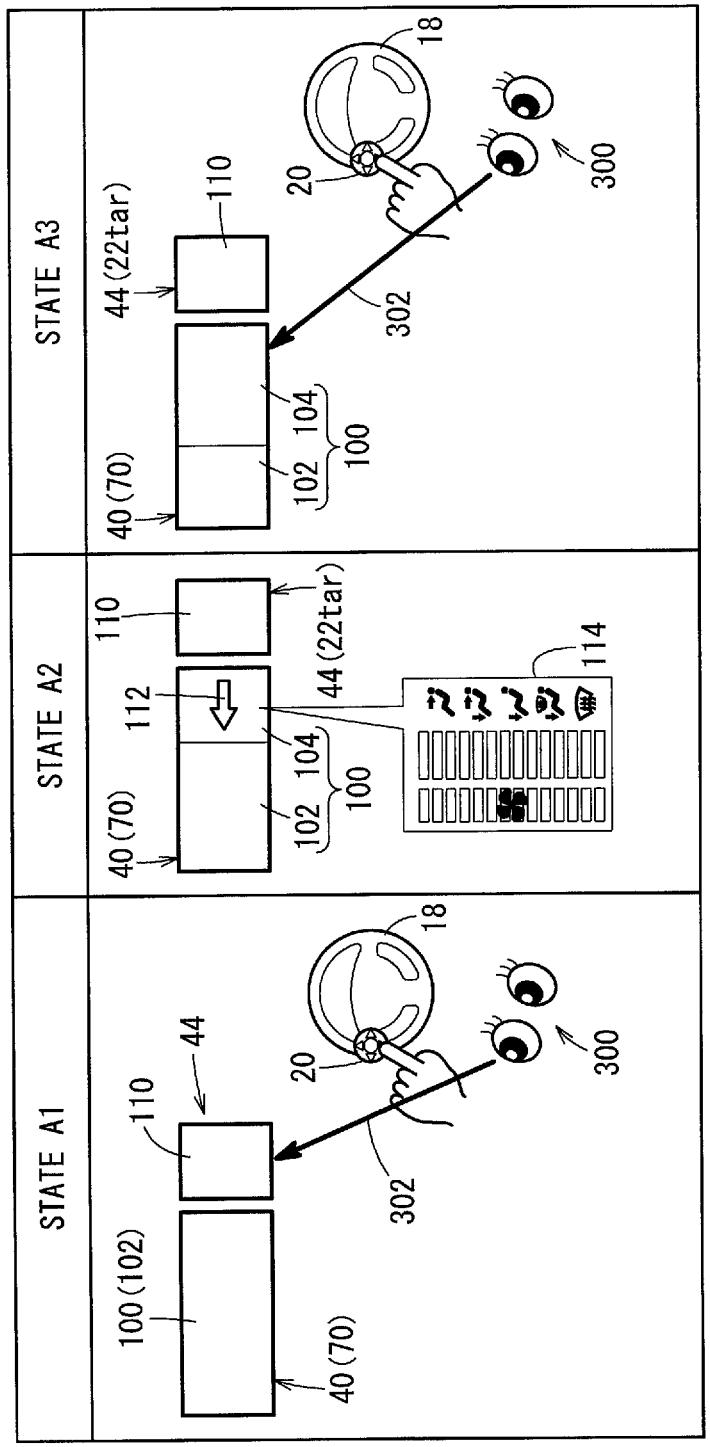
FIG. 7 is a view showing examples of a plurality of states when the display/output-sound control is implemented.

FIG. 6 is a flowchart of a process for controlling displays and output of sound (hereinbelow referred to as a "display/output-sound control") accompanying selection and operation of an operation target device 22tar. The display/output-sound control is implemented by the display/sound control function 96 of the ECU 24. FIG. 7 is a view showing examples of a plurality of states when the display/output-sound control is implemented.

In step S21 of FIG. 6, the ECU 24 judges whether or not operation of the operation target device 22tar has been started. In the case that operation of the operation target device 22tar has started (step S21: YES), the process proceeds to step S22. If operation of the operation target device 22tar has not started (step S21: NO), i.e., in the case that operations are not being carried out or are currently under operation, the process proceeds to step S23.

In step S22, the ECU 24 displays the operation screen 104 on the display device 70. At this time, from the direction in which the operation target device 22tar exists, the ECU 24 causes a popup display of the operation screen 104 with respect to the display device 70.

In state A1 of FIG. 7, operations are not being performed on the operation target device 22tar, and in the display screen 100 of the display device 70, only the non-operation screen 102 is included, whereas the operation screen 104 is not included therein. The display device 70 is arranged between plural blowout ports 110 of the air conditioner 44 (see FIG. 2). Note that in FIG. 7, only the right side blowout port 110 is shown, whereas the left side blowout port 110 is omitted from illustration.

In state A1, if the cross key 20 is pressed under a condition in which the air conditioner 44 (blowout port 110) exists on the line of sight 302 (in the line of sight direction D1) (step S1 of FIG. 4: YES), then a transition is made to state A2 of FIG. 7. More specifically, the ECU 24 selects the air conditioner 44 as the operation target device 22tar (step S5 of FIG. 4), and operation of the air conditioner 44 is started (step S21 of FIG. 6: YES).

Along therewith, the ECU 24 popup displays with respect to the display device 70 the operation screen 104 from the direction in which the air conditioner 44 exists (step S22 of FIG. 6). More specifically, in state A2 of FIG. 7, the operation screen 104 is made to appear in the direction of an arrow 112. As a result, the driver 300 can understand intuitively that information for one of the vehicle-mounted instruments 22 is being displayed on the display device 70 (or stated otherwise, that the operation screen 104 for the air conditioner 44 is being displayed). An illustration 114 displayed on the lower side of state A2 of FIG. 7 shows an example of an operation screen 104 for the air conditioner 44.

In step S23 of FIG. 6, the ECU 24 judges whether or not the operation target device 22tar is currently under operation. More specifically, after the cross key 20 for starting operations has been pressed, a judgment is made as to whether or not another operation has been effected (e.g., whether the cross key 20 has been pressed multiple times, or a state of continual pressing of the cross key 20 is being made) with respect to the cross key 20. If the operation target device 22tar is currently under operation (step S23: YES), then in step S24, the ECU 24 changes the display of the operation screen 104 responsive to the operation input to the cross key 20, together with outputting a sound through the speaker 72.

Figure 10:
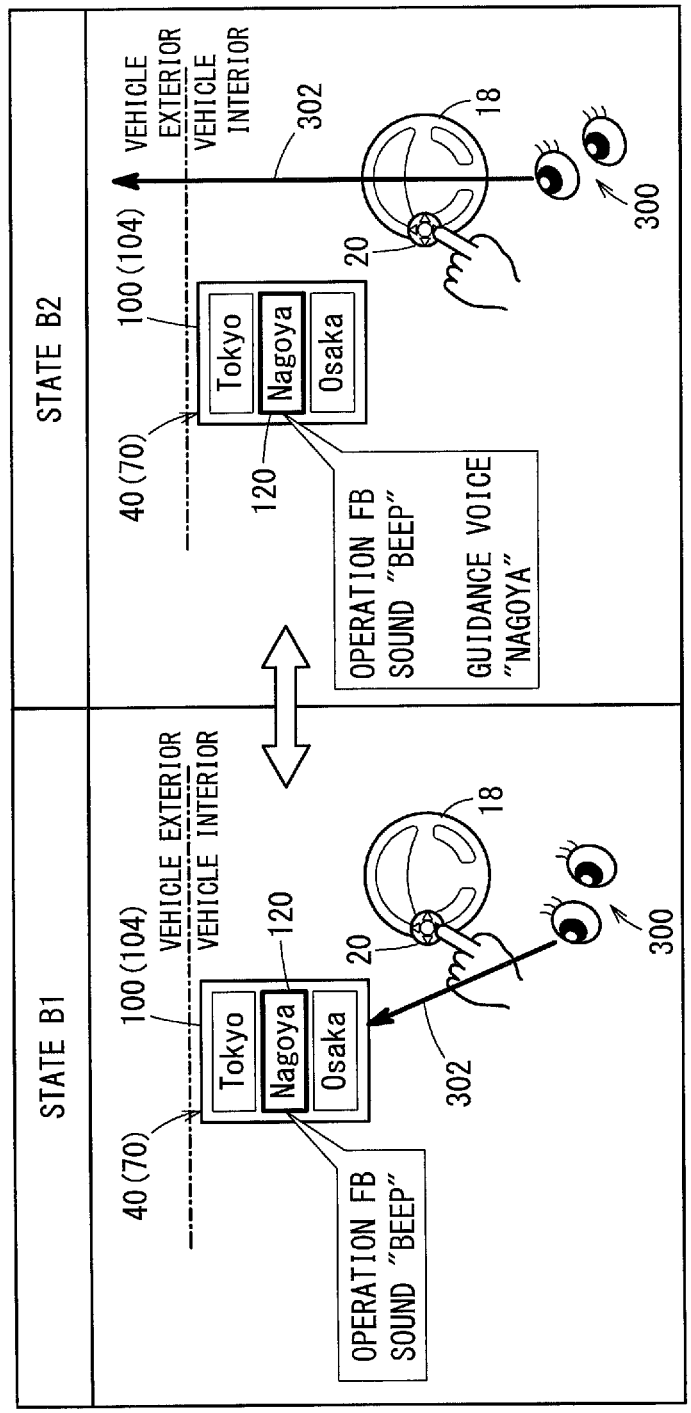
FIG. 10 is a view showing examples of a plurality of states when the output sound variation control is implemented.
Figure 11:
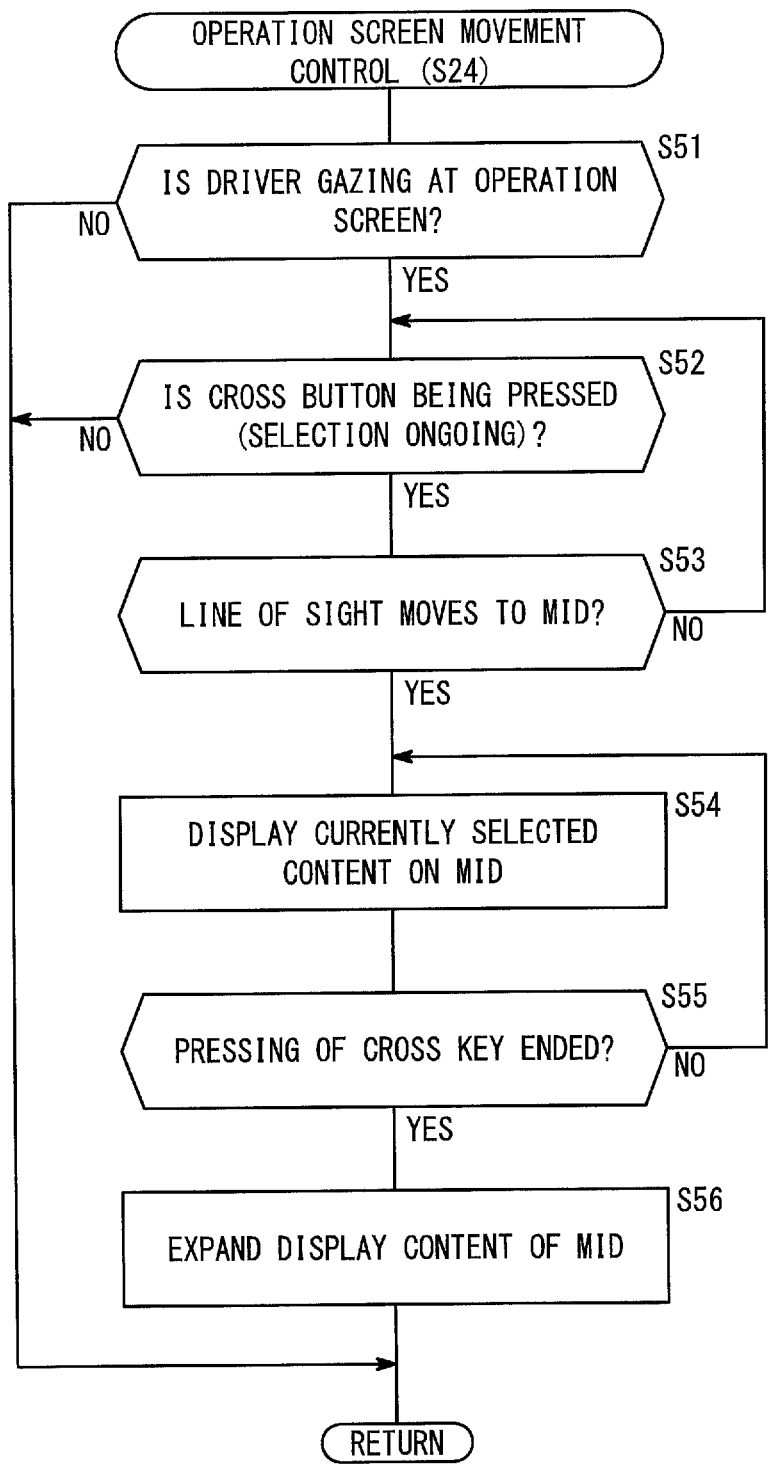
FIG. 11 is a flowchart of an operation screen movement control (part of step S24 of FIG. 6)
Figure 12:
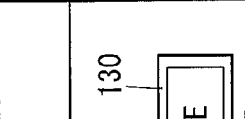
FIG. 12 is a view showing examples of a plurality of states when the operation screen movement control is implemented.

In step S24 of the present embodiment, the ECU 24 carries out an operation screen expansion control (see state A3 of FIG. 7 and FIG. 8), an output sound variation control (see FIGS. 9 and 10), and an operation screen movement control (see FIGS. 11 and 12). In the case that the operation target device 22tar is not currently under operation (step S23: NO), then in step S25, the ECU 24 hides (i.e., does not display) the operation screen 104.

(2-3-2. Operation Screen Expansion Control)

Figure 8:
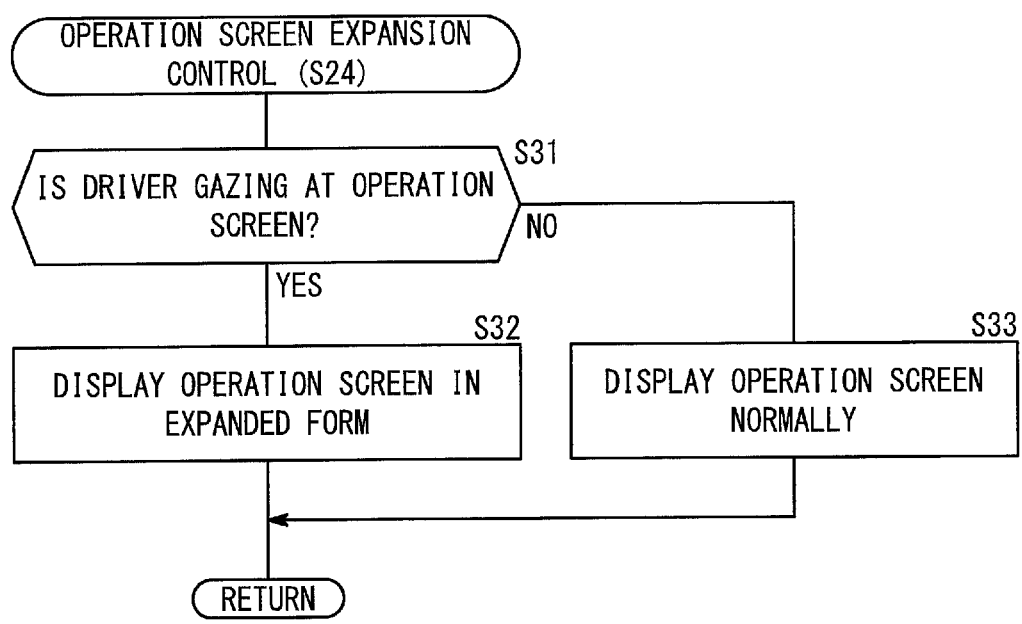
FIG. 8 is a flowchart of an operation screen expansion control (part of step S24 of FIG. 6)

FIG. 8 is a flowchart of an operation screen expansion control (part of step S24 of FIG. 6). In step S31, the ECU 24 judges whether or not the driver 300 is gazing at the operation screen 104. Such a judgment is carried out based on the line of sight 302 (or the line of sight direction D1). With the judgment of step S31, it may also be determined whether or not the driver 300 is currently gazing at the display screen 100, or whether or not the driver 300 is currently gazing at the display device 70.

If the driver 300 is gazing at the operation screen 104 (step S31: YES), then in step S32, the ECU 24 expands the display of the operation screen 104. For example, in state A2 of FIG. 7 (step S22 of FIG. 6), if the driver 300 is gazing at the operation screen 104 (step S31 of FIG. 8: YES), a transition is made to state A3 of FIG. 7. More specifically, the ECU 24 expands the operation screen 104. In state A3 of FIG. 7, although compared to state A2, an expansion is performed in a horizontal (left/right) direction, in addition to or in place thereof, an expansion in a vertical (up/down) direction may be performed.

If the driver 300 is not gazing at the operation screen 104 (step S31: NO), then in step S33, the ECU 24 performs a normal display of the operation screen 104 (the size in state A2 of FIG. 7 is maintained).

(2-3-3. Output Sound Variation Control)

Figure 9:
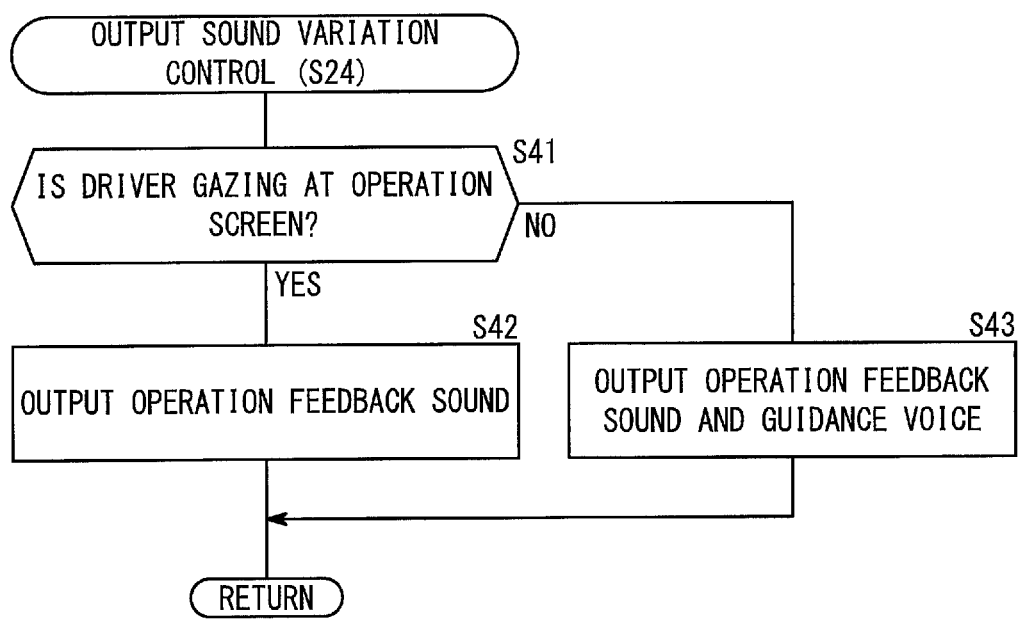
FIG. 9 is a flowchart of an output sound variation control (part of step S24 of FIG. 6)

FIG. 9 is a flowchart of an output sound variation control (part of step S24 of FIG. 6). FIG. 10 is a view showing examples of a plurality of states when the output sound variation control is implemented. In FIG. 10, the cities "Tokyo," "Nagoya", and "Osaka", which are displayed on the display screen 100, for example, are destination candidates (choices) used by the navigation device 40. More specifically, with the example of FIG. 10, the navigation device 40 is selected as the operation target device 22tar. In the case that the audio device 42 is selected as the operation target device 22tar, for example, the names of radio broadcast stations or the names of playable musical titles can be displayed as options on the display screen 100.

In step S41 of FIG. 9, the ECU 24 judges whether or not the driver 300 is gazing at the operation screen 104. Such a judgment is the same as that made in step S31 of FIG. 8.

If the driver 300 is gazing at the operation screen 104 (step S41: YES), then in step S42, the ECU 24 produces a feedback (FB) sound (a selection sound or a beeping sound) corresponding to the operation input to the cross key 20. For example, as shown by state B1 of FIG. 10, as a result of the down button 34 being pressed at a condition in which the option "Tokyo" is selected ("Tokyo" is surrounded by a selection frame 120), the selection frame 120 moves to surround the city "Nagoya", and a "beep" sound is output from the speaker 72 as an operation FB sound.

On the other hand, if the driver 300 is not gazing at the operation screen 104 (step S41: NO), then in step S43, in addition to the operation feedback sound responsive to the operation input to the cross key 20, the ECU 24 outputs a guidance voice. For example, as shown by state B2 of FIG. 10, as a result of the down button 34 being pressed at a condition in which the option "Tokyo" is selected ("Tokyo" is surrounded by the selection frame 120), the selection frame 120 moves to surround the city "Nagoya", the "beep" sound is output, and thereafter the city "Nagoya" is output in the form of a guidance voice.

In the above manner, if the driver 300 is gazing at the operation screen 104 (state B1 of FIG. 10), the guidance voice is not output, whereas if the driver 300 is not gazing at the operation screen 104, the guidance voice is output (state B2). Therefore, the guidance voice can be output only in appropriate circumstances.

More specifically, movement of the selection frame 120 accompanying the operation input (in this case, the up button 32 and the down button 34) of the cross key 20 is carried out in a comparatively short time. In contrast thereto, output of the guidance voice accompanying movement of the selection frame 120 is performed over a comparatively long time. Therefore, if the guidance voice is output though the driver 300 is gazing at the operation screen 104, there is a concern that output of the guidance voice may be felt as an annoyance to the driver 300. Thus, with the present embodiment, in the case that the driver 300 is gazing at the operation screen 104, the guidance voice is not output, whereas if the driver 300 is not gazing at the operation screen 104, the guidance voice can be output. Consequently, convenience to the driver 300 can be enhanced.

Further, in addition to the guidance voice, output of the operation FB sound may also be switched on and off corresponding to whether or not the gaze of the driver 300 is focused on the operation screen 104.

(2-3-4. Operation Screen Movement Control)

FIG. 11 is a flowchart of an operation screen movement control (part of step S24 of FIG. 6). FIG. 12 is a view showing examples of a plurality of states when the operation screen movement control is implemented. In step S51 of FIG. 11, the ECU 24 judges whether or not the driver 300 is gazing at the operation screen 104. Such a judgment is the same as that made in step S31 of FIG. 8. In state C1 of FIG. 12, a condition is shown in which the driver 300 is currently gazing at the operation screen 104, together with selecting an icon "E" as an option by operating the cross key 20. It should be noted that the options may be applied to items other than icons.

In the case that the driver 300 is not gazing at the operation screen 104 (step S51: NO), the current process is brought to an end, and after a predetermined time period, the process is restarted from step S51. If the driver 300 is gazing at the operation screen 104 (step S51: YES), then the process proceeds to step S52.

In step S52, the ECU 24 judges whether or not the cross key 20 (a center button 30 according to the present embodiment) is currently being pressed. The feature that the cross key 20 is currently being pressed implies that the selection of display content on the operation screen 104 is ongoing. In state C2 of FIG. 12, a condition is shown in which the driver 300 is currently gazing at the operation screen 104, together with the center button 30 being pressed continually (in an ongoing manner) in a condition in which the icon "E" is selected. In the case that the (center button 30 of the) cross key 20 is not being pressed (step S52: NO), the current process is brought to an end. In the case that the (center button 30 of the) cross key 20 is being pressed (step S52: YES), the process proceeds to step S53.

In step S53, the ECU 24 judges whether or not the line of sight 302 of the driver 300 has moved to the MID 46. If the line of sight 302 has not moved to the MID 46 (step S53: NO), then the process returns to step S52. If the line of sight 302 has moved to the MID 46 (step S53: YES), then in step S54, on the MID 46, the ECU 24 also displays content whose selection is ongoing in the display device 70. For example, in state C3 of FIG. 12, content of the option "E", which has been selected on the display device 70, is displayed on a display screen 130 of the MID 46. In state C3, although the option "E" is displayed on both the display device 70 and the MID 46, when the display moves to the MID 46, the option "E" may be made to disappear from the display device 70. Further, in this case, although the display content of the display device 70 also is displayed on the MID 46, the display content of the display device 70 may be displayed on other display devices apart from the display device 70 and the MID 46.

In step S55, the ECU 24 judges whether or not pressing of the (center button 30 of the) cross key 20 has ended. If pressing has not ended (step S55: NO), then the process returns to step S54. If pressing has ended (step S55: YES), then in step S56, the ECU 24 confirms (finalizes) the display of the option "E" on the MID 46, and expands the display content of the MID 46. In the event that the line of sight 302 deviates from the MID 46 before pressing is ended, the option "E" is eliminated from the display screen 130.

In the foregoing manner, by moving the display content of the display screen 100 to the MID 46 corresponding to the driver's line of sight 302, information can be moved to a position (the MID 46) that allows the information to be easily viewed by the driver 300. Thus, ease of operation can be enhanced.

3. Advantages of the Present Embodiment

As described above, according to the present embodiment, upon receipt of an input from the driver 300 (operator) by the cross key 20 (operation input unit) (step S1 of FIG. 4: YES), and when any one of the plurality of vehicle-mounted instruments 22 exists on the line of sight 302 of the driver 300 (step S12 of FIG. 5: YES, step S4 of FIG. 4: YES), the vehicle-mounted instrument 22 that exists on the line of sight 302 is selected as the operation target device 22tar (step S5 of FIG. 4). The cross key 20 is a unit for receiving and accepting inputs from the driver 300, for thereby operating each of the plurality of vehicle-mounted instruments 22, and is not used only for detecting the line of sight 302 of the driver 300. Therefore, an operation target device 22tar can easily be selected, and after selection of the operation target device 22tar, the operation target device 22tar can be operated by way of inputs to the cross key 20. Stated otherwise, selection and operation of an operation target device 22tar can be performed using the same cross key 20. Consequently, the configuration for selecting and operating operation target devices 22tar can be simplified, together with enhancing ease of operation of such vehicle-mounted instruments 22 during traveling of the vehicle 10.

In the present embodiment, in a state in which a first vehicle-mounted instrument (for example, the air conditioner 44), which is one of the plurality of vehicle-mounted instruments 22, is selected as the operation target device 22tar, upon receipt of an input from the driver 300 (operator) by the cross key 20 (operation input unit) (step S1 of FIG. 4: YES), when a second vehicle-mounted instrument (for example, the navigation device 40) that differs from the first vehicle-mounted instrument exists on the line of sight 302 (step S12 of FIG. 5: YES, step S4 of FIG. 4: YES), the ECU 24 (control unit) switches the operation target device 22tar from the first vehicle-mounted instrument to the second vehicle-mounted instrument (step S5 of FIG. 4).

Owing thereto, even if the first vehicle-mounted instrument is currently being operated, by the driver 300 switching the driver's line of sight 302 to the second vehicle-mounted instrument and performing an input to the cross key 20, the operation target device 22tar can be switched from the first vehicle-mounted instrument to the second vehicle-mounted instrument. Consequently, switching of operation target devices 22tar can easily be performed.

In the present embodiment, in the case that the line of sight speed V1 is less than or equal to the predetermined speed threshold value THv1 (step S11 of FIG. 5: YES), and any one of the vehicle-mounted instruments 22 exists on the line of sight 302 (step S12: YES), the ECU 24 (control unit) selects the vehicle-mounted instrument 22 that exists on the line of sight 302 as the operation target device 22tar (step S5 in FIG. 4). Further, in the case that the line of sight speed V1 is greater than the speed threshold value THv1 (step S11 of FIG. 5: NO), the ECU 24 does not select the vehicle-mounted instrument 22 that exists on the line of sight 302 as the operation target device 22tar (step S15).

By this feature, switching between operation target devices 22tar can be prevented in the case that the line of sight 302 is moved without intending to make a selection of an operation target device 22tar, for example, if the line of sight 302 merely passes through a given vehicle-mounted instrument 22 or the like. Consequently, ease of operation of the vehicle-mounted instruments 22 can be enhanced, and the driver 300 feeling a sense of unease accompanying unintentional switching of operation target devices 22tar can be avoided.

In the present embodiment, the navigation device 40 (second vehicle-mounted instrument) comprises the display device 70 (first display unit) for displaying the operation screen 104 of the operation target device 22tar (see FIG. 1). For example, in a state in which the air conditioner 44 (first vehicle-mounted instrument) is the operation target device 22tar, upon receipt of an input from the driver 300 (operator) by the cross key 20 (operation input unit), even if the display device 70 exists on the line of sight 302 (step S13 of FIG. 5: YES), the ECU 24 prohibits switching or does not carry out switching of the operation target device 22tar from the air conditioner 44 to the navigation device 40 (see FIG. 7, step S15 of FIG. 5, step S4 of FIG. 4: NO→step S6).

Owing thereto, the driver 300 can carry out operations of the air conditioner 44 while observing the operation screen 104, in which a portion of the navigation device 40 is displayed. Thus, since the driver 300 can easily grasp the settings, etc., of the air conditioner 44, ease of operation for the driver 300 can be enhanced.

In the present embodiment, for example, when the air conditioner 44 (first vehicle-mounted instrument) is selected as the operation target device 22tar, and display of the operation screen 104 for the air conditioner 44 is initiated on the display device 70 (first display unit) (step S21 of FIG. 6: YES), the ECU 24 (control unit) causes the operation screen 104 to appear while moving in a direction from the air conditioner 44 to the display device 70 (the direction of the arrow 112 in FIG. 7) (state A2 of FIG. 7, step S22 of FIG. 6).

As a result, the driver 300 can understand intuitively that the operation screen 104 for one of the vehicle-mounted instruments 22 is being displayed on the display device 70 (in this case, that the operation screen 104 for the air conditioner 44 is being displayed).

In the present embodiment, the vehicle-mounted equipment operating device 12 further comprises the MID 46 (second display unit) that differs from the display device 70 (first display unit) (see FIG. 2). For example, in a state in which the air conditioner 44 (first vehicle-mounted instrument) is the operation target device 22tar, and the operation screen 104 is displayed on the display device 70, if a predetermined input operation (e.g., pressing of the center button 30) is carried out on the cross key 20 (operation input unit) (step S52 of FIG. 11: YES), and the line of sight 302 moves from the display device 70 to the MID 46 (step S53: YES), the ECU 24 (control unit) displays a portion or all of the display content of the operation screen 104 on the MID 46 (step S54 of FIG. 11, and FIG. 12).

Owing thereto, for example, in the case that the driver 300 (operator) wishes to use the MID 46 more than the display device 70, a display that follows with the desire of the driver 300 can be carried out by a simple operation of moving the driver's line of sight 302 and making a predetermined operation input to the cross key 20. In particular, in the event it is easier for the driver 300 to visualize or observe the MID 46 than the display device 70 (see FIG. 2), by displaying operation information on the MID 46, ease of operation can be enhanced.

In the present embodiment, the vehicle-mounted equipment operating device 12 is further equipped with the speaker 72 (sound outputting unit) for outputting a guidance voice (sound) accompanying an input to the cross key 20 (operation input unit) (see FIG. 1). In the case that the display device 70 (first display unit) does not exist on the line of sight 302 (step S41 of FIG. 9: NO), the ECU 24 (control unit) performs output of the guidance voice by the speaker 72 (step S43). Further, in the case that the display device 70 exists on the line of sight 302 (step S41: YES), the ECU 24 stops output of the guidance voice by the speaker 72 (step S42 of FIG. 9, FIG. 10).

By this feature, it is possible to prevent output of a guidance voice that is considered as being unnecessary when the driver 300 is looking at the display device 70, while considered as being necessary if the driver 300 were not looking at the display device 70. Consequently, marketability of the vehicle-mounted equipment operating device 12 can be increased.

4. Modifications

The present invention is not limited to the above-described embodiment, and it is a matter of course that various additional or alternative configurations could be adopted based on the content disclosed in the present specification. For example, the following configurations can be adopted.

[4-1. Objects Capable of Incorporating the Vehicle-Mounted Equipment Operating Device]

In the above embodiment, the operating device 12 is incorporated in a vehicle 10. However, the operating device 12 may be incorporated in other types of objects. For example, the operating device 12 may be incorporated in mobile objects such as ships, aircrafts, etc. Further, the operating device 12 is not limited to being incorporated in mobile bodies, but may be incorporated in other apparatus or systems in which target devices are operated using the line of sight 302 of a subject and an operation input unit such as the cross key 20 or the like.

[4-2. Vehicle Mounted Instruments 22]

In the present embodiment, as the multiple vehicle-mounted instruments 22, examples are cited of the navigation device 40, the audio device 42, the air conditioner 44, the MID 46, the HUD 48, the door mirrors 50, the room mirror 52, the driver seat side window 54, the passenger seat side window 56, the cradle 58, and the hazard lamp 60. However, insofar as being vehicle-mounted instruments 22 which are capable of being operated by an occupant of the vehicle 10, the possible examples thereof are not limited to those cited above.

In the present embodiment, the display device 70 is presented as a portion of the navigation device 40, and the speaker 72 is presented as a portion of the audio device 42. However, the present invention is not limited to these features. Further, for example, from the standpoint of selecting vehicle-mounted instruments 22 responsive to the line of sight 302 and an input to the cross key 20, one or both of the display device 70 and the speaker 72 can be dispensed with. In the case that the display device 70 is dispensed with, the vehicle-mounted instruments 22 may be operated by way of a voice input.

With the above-described embodiment, the operation screen 104 (initial operation screen) of the operation target device 22tar is displayed on the display device 70 (see FIG. 7, etc.). However, the operation screen 104 of the operation target device 22tar may be displayed on a different display device. For example, when a certain operation target device 22tar is selected, the operation screen therefor can also be displayed on the MID 46 or the HUD 48.

[4-3. Cross Key 20 (Operation Input Unit)]

With the above-described embodiment, the cross key 20 is used as an operation input unit for operating the plural vehicle-mounted instruments 22 and for carrying out selection of a given operation target device 22tar. However, the operation input unit is not necessarily limited in this manner. For example, although the cross key 20 of the present embodiment includes the center button 30, the up button 32, the down button 34, the left button 36, and the right button 38, a structure having only the up button 32 and the down button 34, or a structure having only the center button 30, the up button 32, and the down button 34 may be adopted. Alternatively, a structure in which the respective buttons are connected (e.g., the cross button shown in FIG. 4 of Japanese Laid-Open Patent Publication No. 2010-105417) may be employed. Further, each of the buttons of the cross key 20 of the above-described embodiment is a so-called pushbutton type of switch (see FIG. 3). However, other types of switches, such as slide switches, lever switches, etc., may be used. Alternatively, a touch panel can be used as the operation input unit.

With the above-described embodiment, although the cross key 20 is disposed on the steering wheel 18 (see FIGS. 2 and 3), the position where the cross key 20 is disposed is not limited to any particular position. For example, the cross key 20 can be disposed on any one of the steering column and the instrument panel.

[4-4. Line of Sight Detecting Function 90 (Line of Sight Detecting Unit)]

In the above-described embodiment, the line of sight 302 of the driver 300 is detected by the line of sight detecting function 90 (see FIG. 7, etc.). However, the vehicle occupant whose line of sight 302 is detected is not limited to the driver 300, and other vehicle occupants (an occupant seated in the passenger seat, an occupant seated in a rear seat, etc.) may serve as line of sight detection subjects.

[4-5. Selection and Operation of Operation Target Device 22tar]

With the above-described embodiment, selection and operation of the operation target device 22tar is carried out using the processes described in the flowcharts of FIGS. 4 to 6, FIG. 8, FIG. 9, and FIG. 11. However, the selection method and the operation method of the operation target device 22tar are not limited to these features. For example, insofar as the need of lack or need for switching the operation target device 22tar, as carried out in step S3 of FIG. 4, is judged, using only step S12, and without using steps S11 and S13 of FIG. 5, it can be judged whether or not it is necessary to switch operation target devices 22tar.

According to the above-described embodiment, the process of the flowchart of FIG. 4 is used both in the case that an operation target device 22tar is selected, and in the case that an operation target device 22tar is not selected. However, from the standpoint of enabling selection of vehicle-mounted instruments 22 responsive to the line of sight 302 and inputs to the cross key 20, the present invention is not limited to this feature. For example, a process similar to that of the flowchart of FIG. 4 can be carried out only for one of the cases in which the operation target device 22tar is selected, and in which the operation target device 22tar is not selected.

In the above-described embodiment, the cross key 20, which is used for operating the vehicle-mounted instruments 22, also is used as a unit for setting the timing at which selection of an operation target device 22tar is carried out. However, for example, insofar as attention is paid to carrying out selection of operation target devices 22tar at a timing in which an ON operation of an input unit is carried out, the present invention is not limited to this feature. For example, aside from the cross key 20, a unit for setting the timing to carry out selection of operation target devices 22tar (e.g., the line of sight detecting key 26 of JP2012-006552A) can be provided.

According to the above-described embodiment, when display of the operation screen 104 is started, the operation screen 104 is made to appear while moving in a direction from the operation target device 22tar to the display device 70 (step S22 of FIG. 6, state A2 of FIG. 7). However, for example, from the standpoint of displaying the operation screen 104, the method by which the operation screen 104 is made to appear is not limited, and the operation screen 104 can be made to appear without moving.

With the above-described embodiment, in step S24 of FIG. 6, the operation screen expansion control (see FIGS. 7 and 8), the output sound variation control (see FIGS. 9 and 10), and the operation screen movement control (see FIGS. 11 and 12) are carried out. However, for example, from the standpoint of selecting vehicle-mounted instruments 22 responsive to the line of sight 302 and an input to the cross key 20, a portion or all of such controls can be omitted.

With the output sound variation control (see FIG. 9) of the aforementioned embodiment, a setting is made as to whether or not guidance voice is output, depending on whether or not the driver 300 is gazing at the operation screen 104. However, for example, from the standpoint of changing the output sound responsive to whether the driver 300 is gazing at the operation screen 104, the present invention is not limited to this feature. For example, in the case that the driver 300 is currently gazing at the operation screen 104 (step S41: YES), the operation feedback sound and the guidance voice may not be output, whereas in the case that the driver 300 is not gazing at the operation screen 104 (step S41: NO), the operation feedback sound and the guidance voice may be output.

With the operation screen movement control of the above-described embodiment (see FIG. 11), pressing of the cross key 20 (step S52) is included as a condition for causing the display content of the display device 70 to be displayed on the MID 46. However, for example, from the standpoint of causing the display content of the display device 70 to be displayed on the MID 46 responsive to the line of sight 302, concerning operation of the cross key 20, an operation apart from that described above (for example, pressing of any button of the cross key 20 prior to moving one's line of sight 302 to the MID 46) may be employed. Alternatively, the condition of operating the cross key 20 concurrently with displaying the display content of the display device 70 on the MID 46 responsive to the line of sight 302 can be dispensed with.

With the operation screen movement control of the aforementioned embodiment (see FIG. 11), the display content of the display device 70 also is displayed on the MID 46 (see FIG. 12). However, insofar as display content of a specified display device can be displayed on another display device responsive to the line of sight 302, the invention is not limited to this feature. For example, the display content of the MID 46 may be displayed on the display device 70 responsive to the line of sight 302.

With the operation screen movement control of the aforementioned embodiment (see FIG. 11), the display content that is moved is information relating to operations of the operation target device 22tar (see FIG. 12). However, insofar as display content of a specified display device can be displayed on another display device responsive to the line of sight 302, the invention is not limited to this feature. For example, the display content of the non-operation screen 102 may be moved.

What is claimed is:

1. A vehicle-mounted equipment operating device comprising:
    a plurality of vehicle-mounted instruments that are mounted in a vehicle; an operation input unit configured to receive an input from an operator for operating the plurality of vehicle mounted instruments respectively;
    a line of sight detecting unit including an operator image detector configured to detect a line of sight of the operator; and
    an electronic control unit including an input/output unit, a processor, and a storage unit, the electronic control unit configured to control the vehicle-mounted instruments by the input to the operation input unit and the line of sight detected by the line of sight detecting unit,
    wherein, upon receipt of an input from the operator by the operation input unit, and when any one of the plurality of vehicle-mounted instruments exists on the line of sight by the operator gazing steadily thereupon, the electronic control unit selects the vehicle-mounted instrument that exists on the line of sight as an operation target device, and thereafter, the electronic control unit controls the operation target device based on the input of the operator that has been received by the operation input unit,
    wherein, in a state in which a first vehicle-mounted instrument, which is one of
    the plurality of vehicle-mounted instruments, is selected as the operation target device, upon receipt of an input from the operator by the operation input unit, and when a second vehicle-mounted instrument that differs from the first vehicle-mounted instrument exists on the line of sight, the electronic control unit switches the operation target device from the first vehicle-mounted instrument to the second vehicle-mounted instrument,
    wherein:
    the second vehicle-mounted instrument comprises a first display unit configured to display an operation screen for the operation target device; and
    in a state in which the first vehicle-mounted instrument is the operation target device, upon receipt of an input from the operator by the operation input unit, even if the line of sight of the operator moves from the first vehicle-mounted instrument toward the second vehicle-mounted instrument so that the first display unit exists on the line of sight by the operator gazing steadily thereupon, the electronic control unit prohibits switching or does not carry out switching of the operation target device from the first vehicle-mounted instrument to the second vehicle-mounted instrument if the electronic control unit determines that the operation target device is under operation.

2. The vehicle-mounted equipment operating device according to claim 1, wherein:
    in a case that a line of sight speed, which is a moving speed of the line of sight, is less than or equal to a predetermined speed threshold value, and any one of the plurality of vehicle-mounted instruments exists on the line of sight, the electronic control unit selects the vehicle-mounted instrument that exists on the line of sight as the operation target device; and in a case that the line of sight speed is greater than the speed threshold value, the electronic control unit does not select the vehicle-mounted instrument that exists on the line of sight as the operation target device.

3. The vehicle-mounted equipment operating device according to claim 1, wherein, when the first vehicle-mounted instrument is selected as the operation target device, and display of the operation screen for the first vehicle-mounted instrument is initiated on the first display unit, the electronic control unit causes the operation screen to appear while moving in a direction from the first vehicle-mounted instrument to the first display unit.

4. The vehicle-mounted equipment operating device according to claim 1, wherein:

the vehicle-mounted equipment operating device further comprises a second display unit that differs from the first display unit; and in a state in which the first vehicle-mounted instrument is the operation target device and the operation screen is displayed on the first display unit, in a case that a predetermined operation input is carried out on the operation input unit and the line of sight moves from the first display unit to the second display unit, the electronic control unit displays a portion or all of the display content of the operation screen on the second display unit.

5. The vehicle-mounted equipment operating device according to claim 1, wherein:

the vehicle-mounted equipment operating device further comprises a sound outputting unit including a speaker configured to output a sound accompanying an input to the operation input unit; and the electronic control unit performs output of the sound by the sound outputting unit in a case that the first display unit does not exist on the line of sight, and stops output of the sound by the sound outputting unit in a case that the first display unit exists on the line of sight.

* * * * *